(12) United States Patent
Cheng et al.

(10) Patent No.: US 7,533,520 B2
(45) Date of Patent: May 19, 2009

(54) EXHAUST AFTERTREATMENT MIXER WITH STAMPED MUFFLER FLANGE

(75) Inventors: C. Raymond Cheng, Madison, WI (US); Thomas E. Page, Stoughton, WI (US)

(73) Assignee: Fleetguard, Inc., Nashville, TN (US)

( * ) Notice: Subject to any disclaimer, the term of this patent is extended or adjusted under 35 U.S.C. 154(b) by 436 days.

(21) Appl. No.: 11/409,587

(22) Filed: Apr. 24, 2006

(65) Prior Publication Data
US 2007/0245718 A1    Oct. 25, 2007

(51) Int. Cl.
*F01N 3/00* (2006.01)
(52) U.S. Cl. .......................... 60/286; 60/274
(58) Field of Classification Search .................. 60/286, 60/299, 303, 324
See application file for complete search history.

(56) References Cited

U.S. PATENT DOCUMENTS

| | | | |
|---|---|---|---|
| 6,449,947 B1 | 9/2002 | Liu et al. | |
| 6,536,420 B1 * | 3/2003 | Cheng | 123/590 |
| 6,601,385 B2 | 8/2003 | Verdegan et al. | |
| 6,712,869 B2 | 3/2004 | Cheng et al. | |
| 6,722,123 B2 | 4/2004 | Liu et al. | |
| 6,796,296 B2 * | 9/2004 | Kim | 123/590 |
| 2005/0257530 A1 | 11/2005 | Zupanc et al. | |
| 2006/0048500 A1 * | 3/2006 | Loving | 60/282 |

FOREIGN PATENT DOCUMENTS

JP    2003232218    8/2003

* cited by examiner

*Primary Examiner*—Thomas E Denion
*Assistant Examiner*—Diem Tran
(74) *Attorney, Agent, or Firm*—Andrus, Sceales, Starke & Sawall, LLP; J. Bruce Schelkopf

(57) ABSTRACT

An exhaust aftertreatment system, including injection of chemical species, has a mixer in the exhaust pipe between the injector and the aftertreatment element. The mixer is provided by a stamped muffler flange.

13 Claims, 8 Drawing Sheets

EXHAUST AFTERTREATMENT MIXER WITH STAMPED MUFFLER FLANGE

BACKGROUND AND SUMMARY

The invention relates to aftertreatment systems for internal combustion engine exhaust, and more particularly to chemical species injection mixing.

To address engine emission concerns, new standards continue to be proposed for substantial reduction of various emissions, including NOx and particulate emissions. Increasingly stringent standards will require installation of aftertreatment devices in engine exhaust systems. Some of the aftertreatment technologies require certain chemical species to be injected into the exhaust system. For example, HC or fuel is injected in some active lean NOx systems for NOx reduction, or in active diesel particulate filters (DPF) for regeneration to take place (oxidizing the soot and cleaning the filter), and urea solution is injected in selective catalytic reduction (SCR) systems for NOx reduction. These injected chemical species need to be well mixed with exhaust gas before reaching catalysts or filters for the systems to perform properly.

The present invention arose during continuing development efforts directed toward the above exhaust aftertreatment systems.

DETAILED DESCRIPTION

Figure 1:
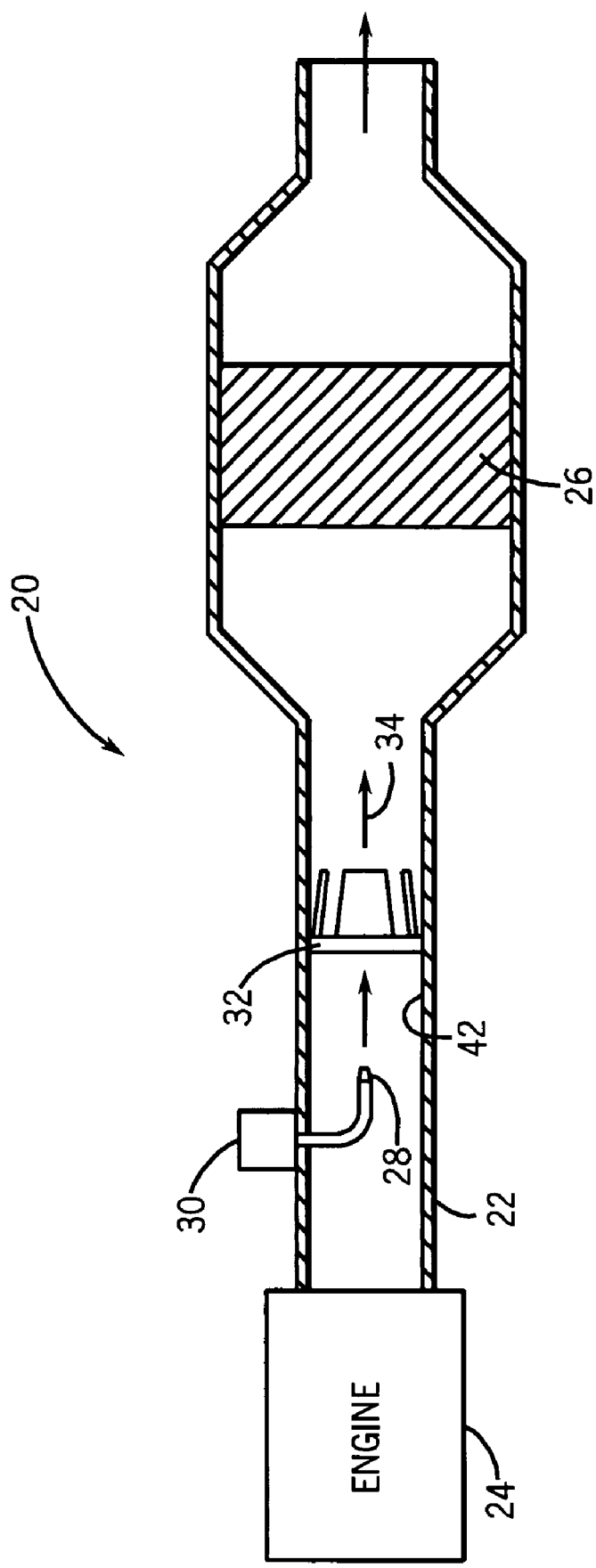
FIG. 1 is a schematic view of an exhaust aftertreatment system in accordance with the invention.

FIG. 1 shows an exhaust aftertreatment system 20 including an exhaust pipe 22 carrying internal combustion engine exhaust from engine 24 to an aftertreatment element 26 treating the exhaust, for example a selective catalytic reduction (SCR) catalyst and/or an oxidation catalyst (e.g. a diesel oxidation catalyst, DOC). An injector 28 is provided upstream of aftertreatment element 26 and injects chemical species mixing with the exhaust prior to reaching aftertreatment element 26. For example, in one embodiment, aqueous urea solution is injected from reservoir or tank 30. A mixer 32 is provided in the exhaust pipe between injector 28 and aftertreatment element 26. The injected chemical species needs to be well-mixed with the exhaust gas prior to reaching aftertreatment element 26 to ensure optimal performance for chemical reaction. Mixer 32 is provided by a stamped muffler flange, to be described. Exhaust flows (left to right in FIG. 1) through exhaust pipe 22 along an axial flow direction 34 through mixer 32.

Figure 2:
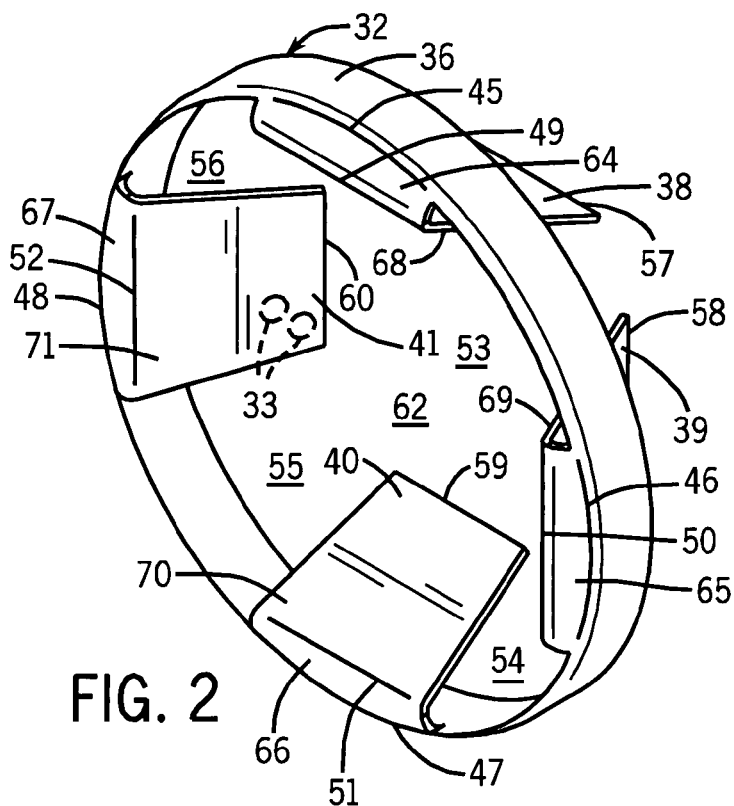
FIG. 2 is a perspective view of a mixer device for use in the system of FIG. 1.

Mixer 32, FIG. 2, has an outer annular border 36 extending circumferentially around the interior sidewall of exhaust pipe 22 and also extending axially along axial flow direction 34, and having a plurality of tabs 38, 39, 40, 41 bent radially inwardly therefrom. The tabs may be solid or perforated. Exhaust pipe 22 has an inner wall 42 of a given inner diameter at mixer 32. Border 36 has an outer diameter substantially equal to the noted given inner diameter and engaging inner wall 42 in press-fit relationship. Border 36 has an axial length 44 along axial flow direction 34 sufficient to prevent skewing of mixer 32 within exhaust pipe 22 due to exhaust pressure. In one embodiment, mixer 32 at border 36 is welded to exhaust pipe 22 at inner wall 42. Tabs 38-41 may be solid and non-perforated as shown, or may be perforated as shown in dashed line at 33.

Figure 3:
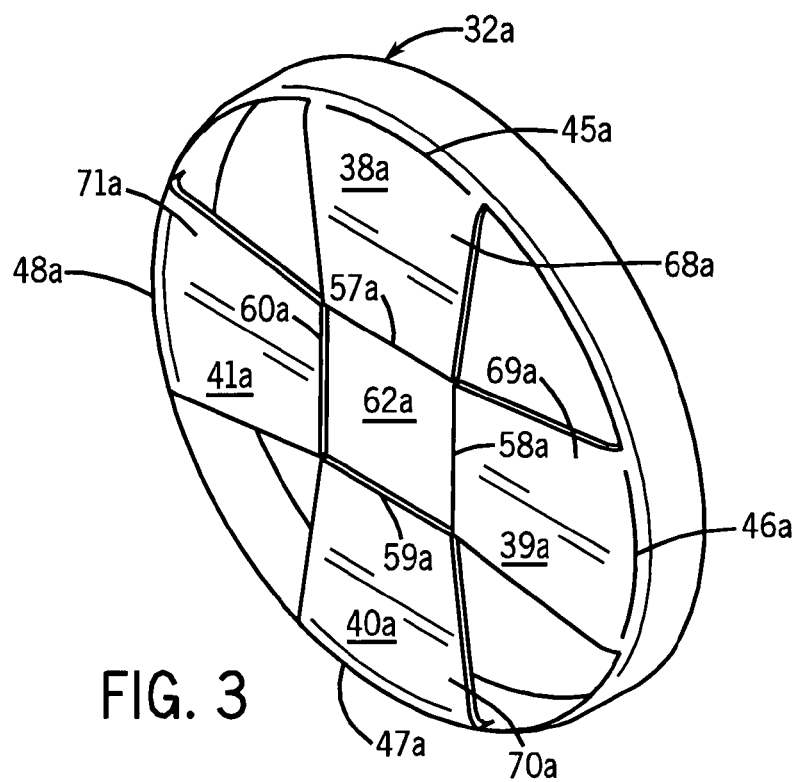
FIG. 3 shows an intermediate manufacturing step for forming the embodiment of FIG. 2.

Tabs 38-41 are bent at respective bend lines 45-48 and/or 49-52 and extend radially inwardly therefrom. The tabs are separated by respective gaps 53-56 therebetween through which exhaust flows. The tabs extend radially inwardly to inner ends 57-60 defining a central opening 62 through which exhaust flows. In FIG. 2, the inner ends 57-60 of tabs 38-41 are spaced from each other, and central opening 62 and gaps 53-56 are in open communication with each other. FIG. 3 shows an intermediate manufacturing step for forming the embodiment of FIG. 2, wherein tabs 38a-41a of flange preform 32a may touch each other at inner ends 57a-60a around central opening 62a and tabs 38a-41a each have only a single bend line 45a-48a, whereafter tabs 38a-41a are bent to the position shown in FIG. 2. Tabs 38-41 of mixer 32 in FIG. 2 each have a first bend line at border 36, and a second bend line 49-52 radially inwardly thereof. Tabs 38-41 are bent radially inwardly at a first set of bend lines 45-48, and are bent at a second set of bend lines 49-52 back toward border 36. In another embodiment, FIG. 4, the tabs may be bent away from the border at the second bend line, for example as shown at mixer 32b having border 36b with tabs 38b-41b bent at first bend lines 45b-48b and then at second bend lines 49b-52b. Bend lines 45b-48b are at border 36b. Bend lines 49b-52b are spaced radially inwardly of border 36b. The two sets of bend lines, namely first set of bend lines 45b-48b, and second set of bend lines 49b-52b, provide compound bending of respective tabs 38b-41b.

Figure 4:
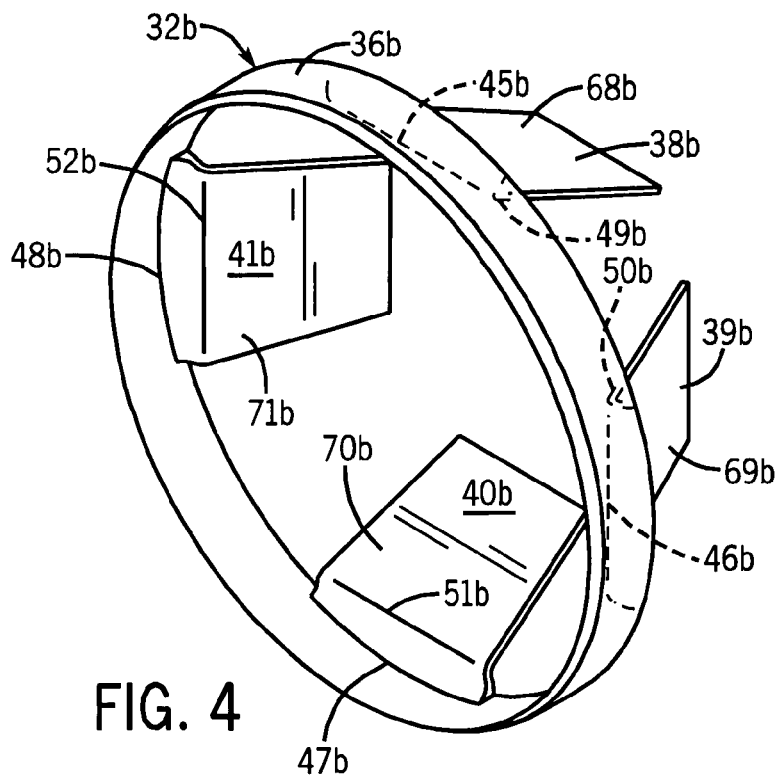
FIG. 4 is like FIG. 2 and shows another embodiment.

In FIG. 2, tabs 38, 39, 40, 41 have respective first spans 64, 65, 66, 67 extending from respective first bend lines 45, 46, 47, 48 to respective second bend lines 49, 50, 51, 52, and have respective second spans 68, 69, 70, 71 extending from respective second bend lines 49, 50, 51, 52 to respective inner ends 57, 58, 59, 60. Second spans 68-71 extend obliquely relative to axial flow direction 34. In FIG. 4, second spans 68b-71b extend obliquely to axial flow direction 34.

Figure 5:
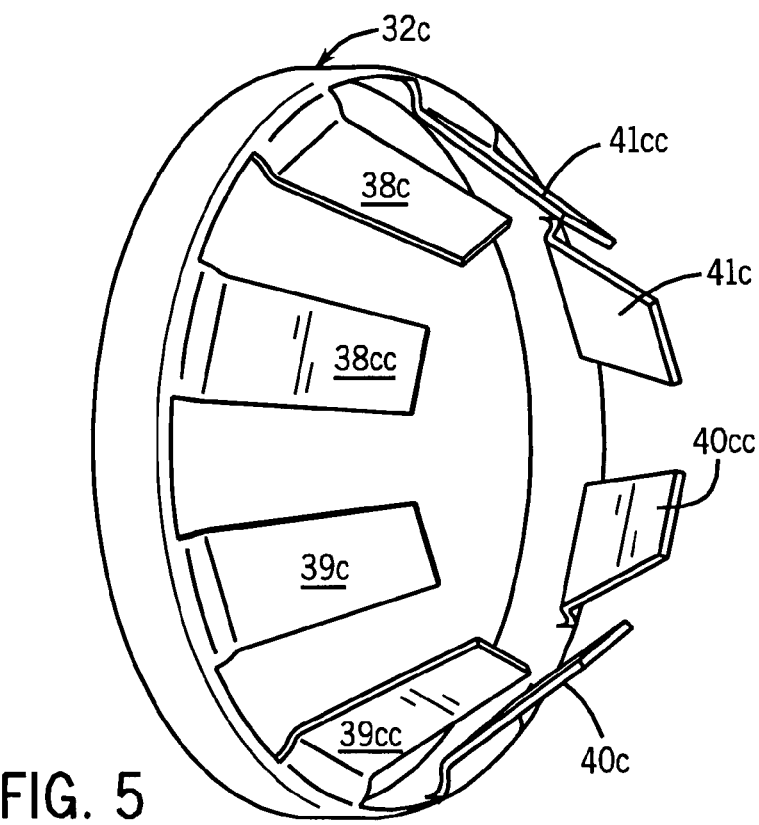
FIG. 5 is like FIG. 2 and shows another embodiment.

FIG. 5 shows another mixer 32c similar to mixer 32b of FIG. 4 but having eight tabs 38c, 38cc, 39c, 39cc, 40c, 40cc, 41c, 41cc.

Figure 6:
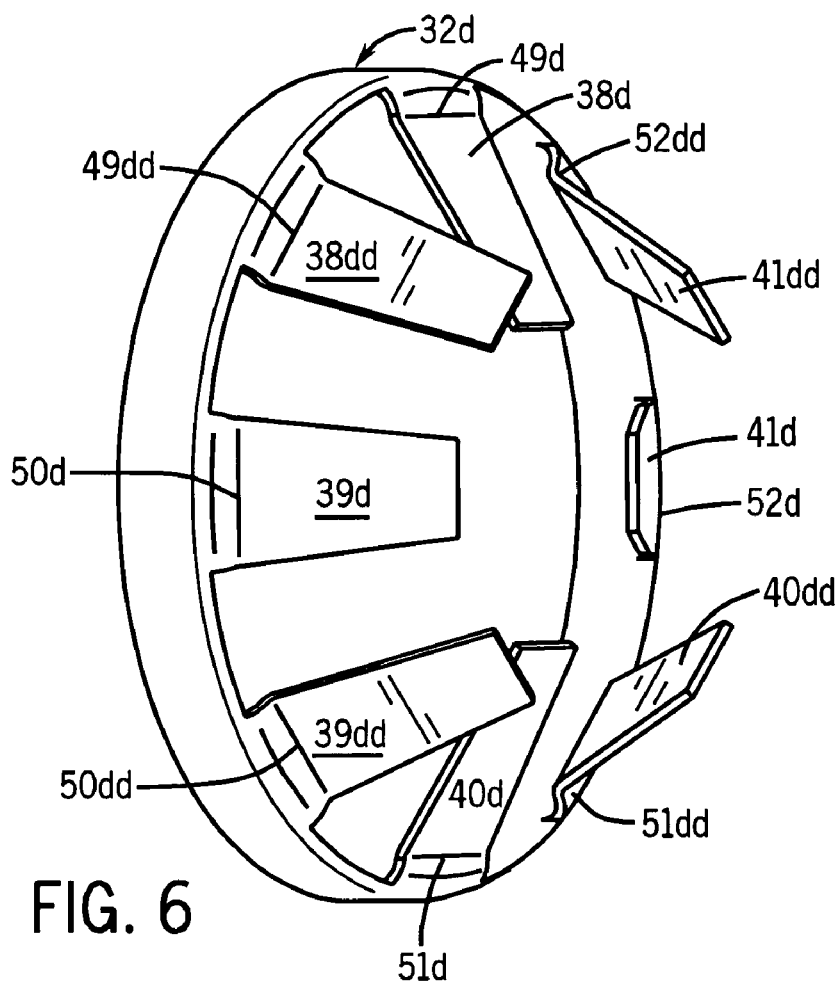
FIG. 6 is like FIG. 2 and shows another embodiment.
Figure 7:
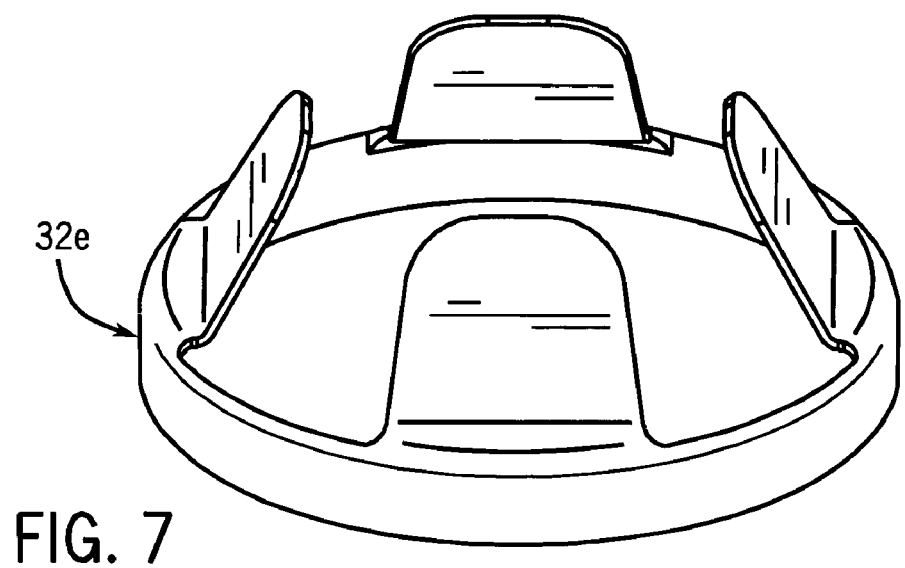
FIG. 7 is like FIG. 2 and shows another embodiment.

FIG. 6 shows another embodiment similar to FIG. 5 but showing a mixer 32d having a first set of tabs 38d, 39d, 40d, 41d, bent at first bend angles 49d, 50d, 51d, 52d relative to axial flow direction 34, and a second set of tabs 38dd, 39dd, 40dd, 41dd bent at second bend angles 49dd, 50dd, 51dd, 52dd relative to axial flow direction 34, wherein the noted second bend angles 49dd-52dd are different than the noted first bend angles 49d-52d. First bend angles 49d-52d are greater than second bend angles 49dd-52dd, and the second set of tabs 38dd-41dd extend axially further downstream toward aftertreatment element 26 than the first set of tabs 38d-41d, and the first set of tabs 38d-41d extend further radially inwardly than the second set of tabs 38dd-41dd. The first and second sets of tabs comprise respectively a plurality of first tabs 38d-41d alternating with a plurality of second tabs 38dd-41dd to provide a plurality of tabs of a first bend angle 49d-52d alternating with a plurality of tabs 38dd-41dd of a second bend angle 49dd-52dd. Tabs 38d-41d of the noted first bend angle 49d-52d provide the noted first set, and tabs 38dd-41dd of the second bend angle 49dd-52dd provide the noted second set.

Figure 8:
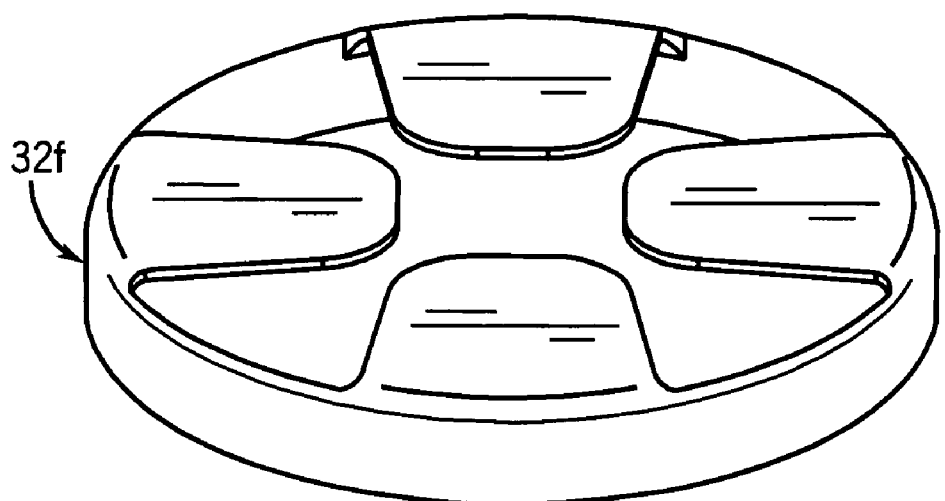
FIG. 8 shows an intermediate manufacturing step for forming the embodiment of FIG. 7.
Figure 9:
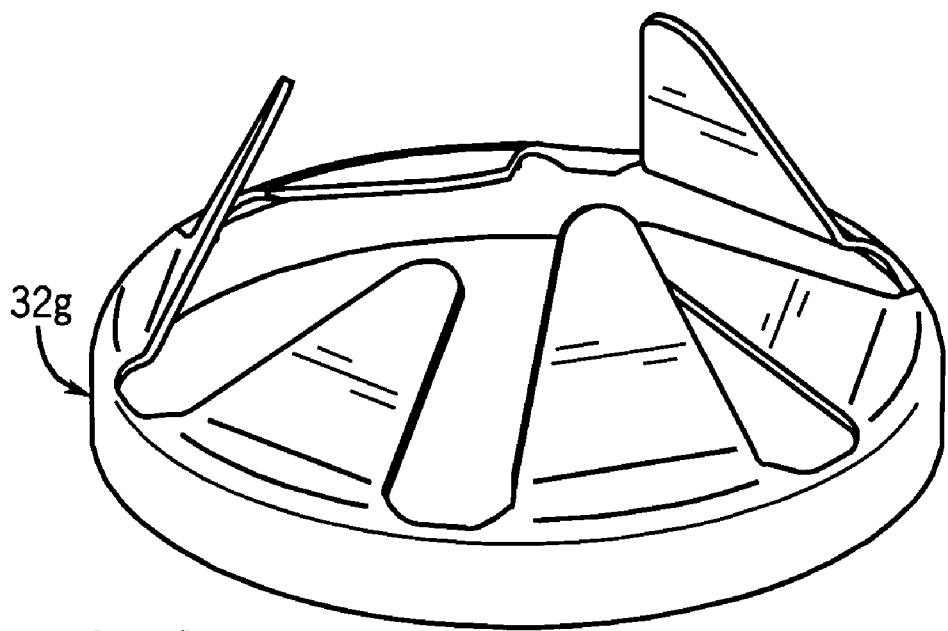
FIG. 9 is like FIG. 2 and shows another embodiment.
Figure 10:
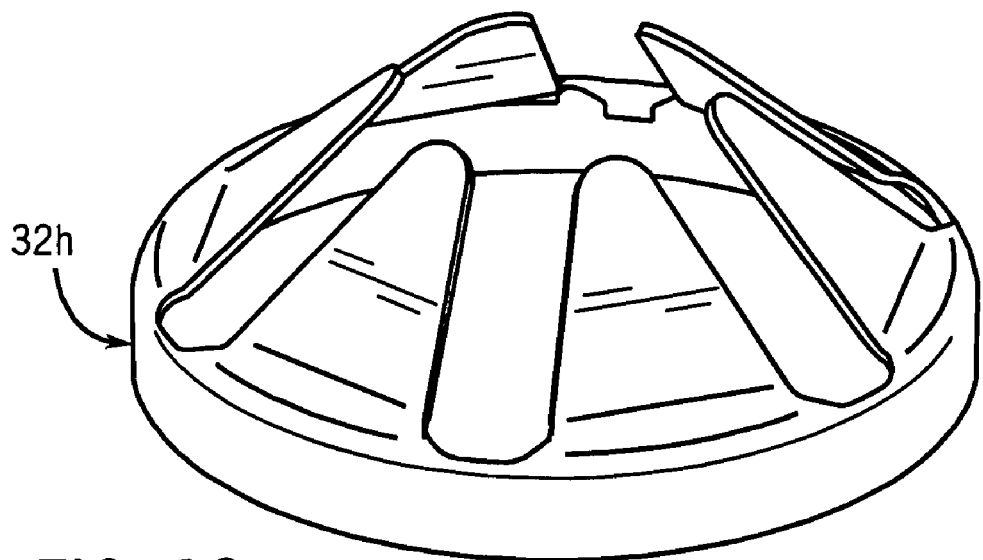
FIG. 10 is like FIG. 2 and shows another embodiment.
Figure 11:
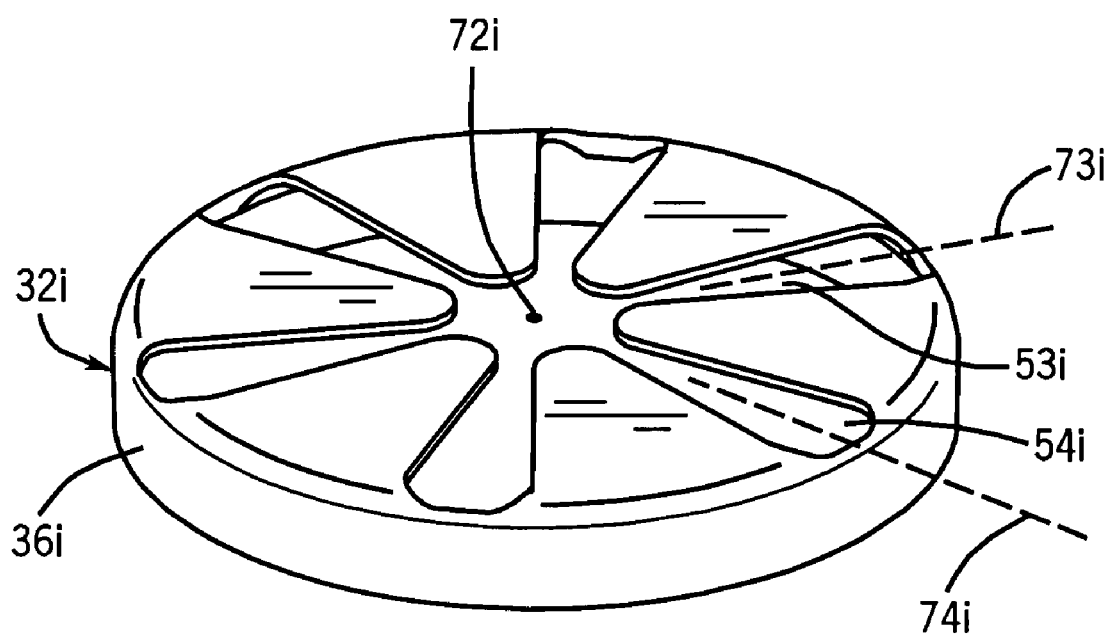
FIG. 11 shows an intermediate manufacturing step for forming the embodiment of FIG. 10.
Figure 12:
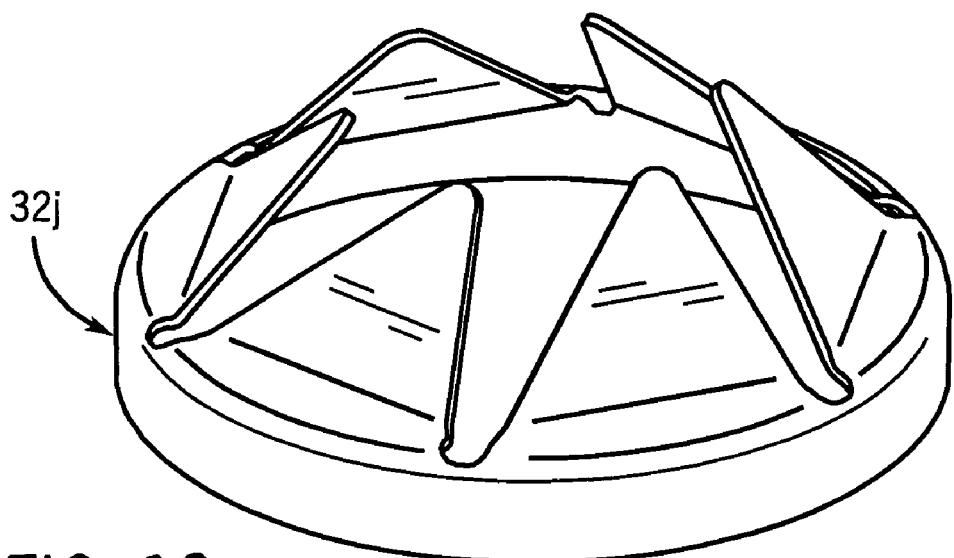
FIG. 12 is like FIG. 2 and shows another embodiment.
Figure 13:
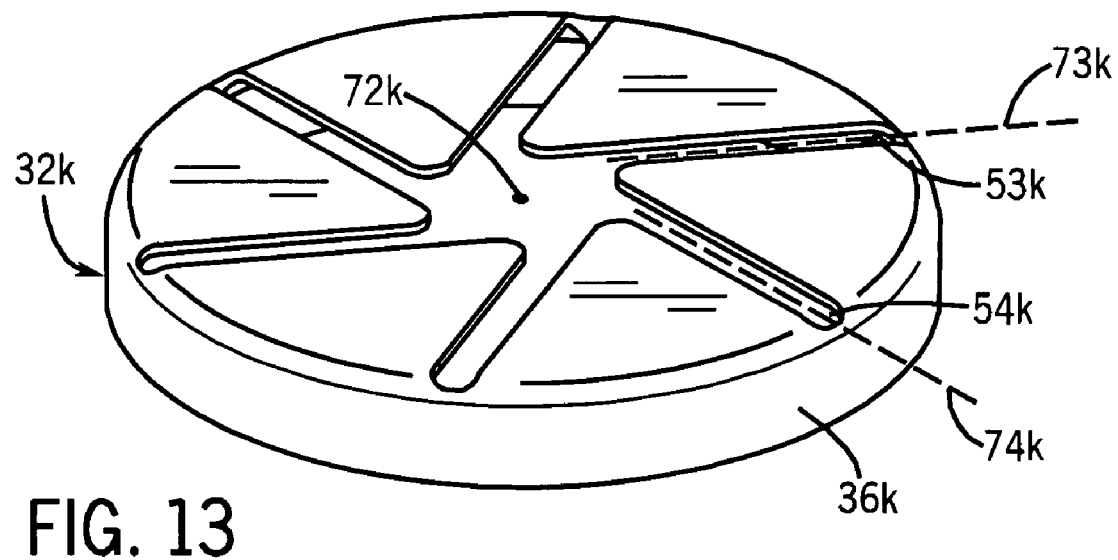
FIG. 13 shows an intermediate manufacturing step for forming the embodiment of FIG. 12.

FIGS. 7, 9, 10, 12 show further embodiments at mixers 32e, 32g, 32h, 32j, respectively, and FIGS. 8, 11, 13 show the respective flange pre-forms therefore at 32f, 32i, 32k. The mixer at the noted border, e.g. border 36i, defines a circumference having center point, e.g. 72i. The noted gaps, e.g. 53i, 54i, etc. extend inwardly from border 36i along projection lines, e.g. 73i, 74i, etc. lying along radial lines intersecting center point 72i. In an alternative, FIG. 13, gaps 53k, 54k, etc. extend inwardly from border 36k along projection lines 73k, 74k, etc. non-intersecting center point 72k, wherein projection lines 73k, 74k, etc. extend obliquely relative to radial lines between center point 72k and border 36k.

Figure 14:
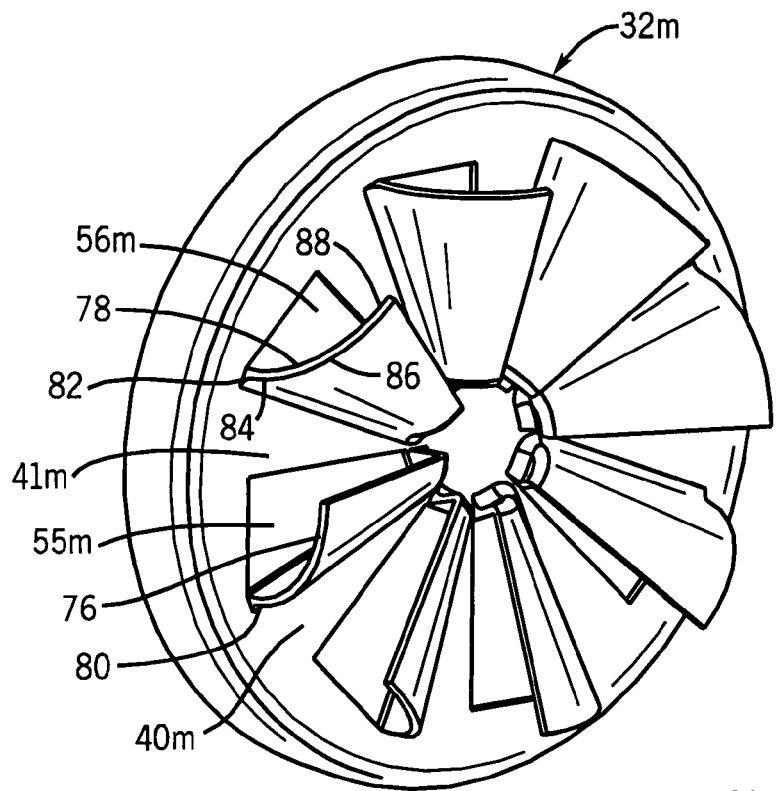
FIG. 14 is like FIG. 2 and shows another embodiment.

FIG. 14 shows a further embodiment of a mixer 32m having vanes such as 76, 78, etc. extending from respective tabs and guiding exhaust flow therealong. The vanes extend from respective tabs 40m, 41m, etc., at respected interfaces such as 80, 82, etc. with respective gaps such as 55m, 56m, etc. The vanes extend axially at 84 from a respective interface such as 82 and are curved at 86 along a guide surface 88 axially spaced from and axially aligned with a respective gap such as 56m.

Figure 15:
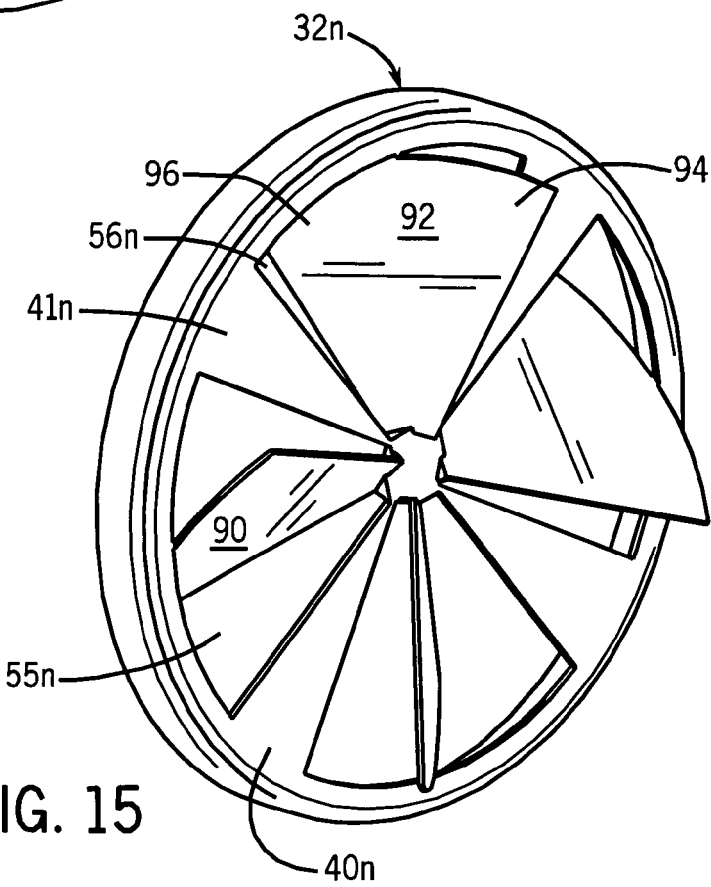
FIG. 15 is like FIG. 2 and shows another embodiment.

FIG. 15 shows another embodiment at mixer 32n. Gaps such as 55n, 56n, etc. lie in a plane taken laterally to axial flow direction 34. Vanes 90, 92, etc. are provided in the gaps and guide exhaust flow therealong. Vanes 90, 92, etc. extend at an oblique angle relative to the noted plane of gaps 55n, 56n, etc. The vanes include a first segment such as 94 upstream of the noted plane of the gaps, and a second segment such as 96 downstream of such plane. The vanes are preferably disposed in respective openings in the mixer through which exhaust flows, which openings are preferably provided by the noted gaps 55n, 56n, etc. between respective tabs such as 40n, 41n, etc.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations described herein maybe used alone or in combination with other configurations. It is to be expected that various equivalents, alternatives and modifications are possible within the scope of the appended claims.

What is claimed is:

1. An exhaust aftertreatment system comprising an exhaust pipe carrying exhaust to an aftertreatment element treating said exhaust, an injector injecting chemical species mixing with said exhaust prior to reaching said aftertreatment element, a mixer in said exhaust pipe between said injector and said aftertreatment element, wherein said mixer is a stamped muffler flange, wherein said exhaust flows through said exhaust pipe along an axial flow direction through said mixer, and said mixer comprises an outer annular border extending axially along said axial flow direction and having a plurality of tabs bent radially inwardly therefrom, wherein said tabs are bent at respective bend lines and extend radially inwardly therefrom, said tabs being separated by gaps therebetween through which exhaust flows, and comprising at least a first of said tabs bent at a first bend angle relative to said axial flow direction, and at least a second of said tabs bent at a second bend angle relative to said axial flow direction, said second bend angle being different than said first bend angle.

2. The exhaust aftertreatment system according to claim 1 wherein said first bend angle is greater than said second bend angle, and said second tab extends axially further downstream toward said aftertreatment element than said first tab, and said first tab extends further radially inwardly than said second tab.

3. The exhaust aftertreatment system according to claim 1 comprising first and second sets of tabs comprising respectively a plurality of said first tabs alternating with a plurality of said second tabs to provide a plurality of tabs of said first bend angle alternating with a plurality of tabs of said second bend angle, said tabs of said first bend angle comprising said first set, said tabs of said second bend angle comprising said second set.

4. An exhaust aftertreatment system comprising an exhaust pipe carrying exhaust to an aftertreatment element treating said exhaust, an injector injecting chemical species mixing with said exhaust prior to reaching said aftertreatment element, a mixer in said exhaust pipe between said injector and said aftertreatment element, wherein said mixer is a stamped muffler flange, wherein said exhaust flows through said exhaust pipe along an axial flow direction through said mixer, and said mixer comprises an outer annular border extending axially alone said axial flow direction and having a plurality of tabs bent radially inwardly therefrom, wherein said tabs are bent at respective bend lines and extend radially inwardly therefrom, said tabs being separated by gaps therebetween through which exhaust flows, and wherein said bend lines are spaced radially inwardly of said border.

5. An exhaust aftertreatment system comprising an exhaust pipe carrying exhaust to an aftertreatment element treating said exhaust, an injector injecting chemical species mixing with said exhaust prior to reaching said aftertreatment element, a mixer in said exhaust pipe between said injector and said aftertreatment element, wherein said mixer is a stamped muffler flange, wherein said exhaust flows through said exhaust pipe alone an axial flow direction through said mixer, and said mixer comprises an outer annular border extending axially along said axial flow direction and having a plurality of tabs bent radially inwardly therefrom, and wherein at least one of said tabs has first and second bend lines providing compound bending of said at least one tab.

6. The exhaust aftertreatment system according to claim 5 wherein said first bend line is at said border, and said second bend line is spaced radially inwardly of said first bend line.

7. The exhaust aftertreatment system according to claim 6 wherein said at least one tab has a first span extending from said first bend line to said second bend line, and a second span extending from said second bend line to an inner end, wherein at least one of said first and second spans extends obliquely relative to said axial flow direction.

8. An exhaust aftertreatment system comprising an exhaust pipe carrying exhaust to an aftertreatment element treating said exhaust, an injector injecting chemical species mixing with said exhaust prior to reaching said aftertreatment element, a mixer in said exhaust pipe between said injector and said aftertreatment element, wherein said mixer is a stamped muffler flange, wherein said exhaust flows through said exhaust pipe along an axial flow direction through said mixer, and said mixer comprises an outer annular border extending axially along said axial flow direction and having a plurality of tabs bent radially inwardly therefrom, and wherein said tabs are bent at respective bend lines and extend radially inwardly therefrom, said tabs being separated by gaps therebetween through which exhaust flows, said tabs extending radially inwardly to inner ends defining a central opening through which exhaust flows, and wherein said border defines a circumference having a center point, and wherein gaps extend inwardly from said border along projection lines non-intersecting said center point, said projection lines extending obliquely relative to radial lines between said center point and said border.

9. An exhaust aftertreatment system comprising an exhaust pipe carrying exhaust to an aftertreatment element treating said exhaust, an injector injecting chemical species mixing with said exhaust prior to reaching said aftertreatment element, a mixer in said exhaust pipe between said injector and said aftertreatment element, wherein said mixer is a stamped muffler flange, wherein said exhaust flows through said exhaust pipe along an axial flow direction through said mixer, and said mixer comprises an outer annular border extending axially along said axial flow direction and having a plurality of tabs bent radially inwardly therefrom, wherein said tabs are bent at respective bend lines and extend radially inwardly therefrom, said tabs being separated by gaps therebetween through which exhaust flows, and comprising vanes extending from said tabs and guiding exhaust flow therealong.

10. The exhaust aftertreatment system according to claim 9 wherein said vanes extend from said tabs at respective interfaces with said gaps.

11. The exhaust aftertreatment system according to claim 10 wherein said vanes extend axially from respective said interfaces and are curved along a guide surface axially spaced from and axially aligned with a respective said gap.

12. An exhaust aftertreatment system comprising an exhaust pipe carrying exhaust to an aftertreatment element treating said exhaust, an injector injecting chemical species mixing with said exhaust prior to reaching said aftertreatment element, a mixer in said exhaust pipe between said injector and said aftertreatment element, wherein said mixer is a stamped muffler flange, wherein said exhaust flows through said exhaust pipe along an axial flow direction through said mixer, and said mixer comprises an outer annular border extending axially along said axial flow direction and having a plurality of tabs bent radially inwardly therefrom, wherein said tabs are bent at respective bend lines and extend radially inwardly therefrom, said tabs being separated by gaps therebetween through which exhaust flows, and wherein said gaps lie in a plane taken laterally to said axial flow direction, and comprising vanes in said gaps and guiding exhaust flow therealong, wherein said vanes extend at an oblique angle relative to said plane and include a first segment upstream of said plane and a second segment downstream of said plane.

13. An exhaust aftertreatment system comprising an exhaust pipe carrying exhaust to an aftertreatment element treating said exhaust, an injector injecting chemical species mixing with said exhaust prior to reaching said aftertreatment element, a mixer in said exhaust pipe between said injector and said aftertreatment element, wherein said mixer is a stamped muffler flange, wherein said exhaust flows through said exhaust pipe along an axial flow direction through a plurality of openings in said mixer providing gaps therethrough, wherein said gaps lie in a plane taken laterally to said axial flow direction, and comprising vanes in said gaps and guiding exhaust flow therealong, wherein said vanes extend at an oblique angle relative to said plane and include a first segment upstream of said plane and a second segment downstream of said plane.

* * * * *